United States Patent
Brookman et al.

(10) Patent No.: US 12,503,793 B2
(45) Date of Patent: *Dec. 23, 2025

(54) FIRE RETARDANT NYLON FIBERS AND METHODS FOR MAKING THEM

(71) Applicant: BROOKWOOD COMPANIES INCORPORATED, New York, NY (US)

(72) Inventors: Amber Marie Brookman, Westport, CT (US); David Alden Capwell, West Greenwich, RI (US); Jen-Yee Hsu, Taipei (TW)

(73) Assignee: BROOKWOOD COMPANIES INCORPORATED, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/671,568

(22) Filed: May 22, 2024

(65) Prior Publication Data

US 2025/0003116 A1     Jan. 2, 2025

Related U.S. Application Data

(63) Continuation of application No. 17/933,359, filed on Sep. 19, 2022, now Pat. No. 12,018,406, which is a continuation of application No. 17/124,598, filed on Dec. 17, 2020, now Pat. No. 11,447,895, which is a continuation of application No. 16/442,758, filed on Jun. 17, 2019, now Pat. No. 10,883,199, which is a
(Continued)

(51) Int. Cl.
*D01F 6/90* (2006.01)
*D01F 1/07* (2006.01)
*D01F 6/60* (2006.01)

(52) U.S. Cl.
CPC ............... *D01F 6/90* (2013.01); *D01F 1/07* (2013.01); *D01F 6/60* (2013.01); *D10B 2331/02* (2013.01)

(58) Field of Classification Search
CPC ..... D01F 6/90; D01F 1/07; D01F 6/60; D10B 2331/02
See application file for complete search history.

(56) References Cited

U.S. PATENT DOCUMENTS

| | | |
|---|---|---|
| 3,950,306 A | 4/1976 | Pews et al. |
| 4,141,880 A | 2/1979 | Nametz et al. |
| 5,431,986 A | 7/1995 | Ortega et al. |

(Continued)

FOREIGN PATENT DOCUMENTS

CN     102234422 B     11/2011

OTHER PUBLICATIONS

International Search Report and Written Opinion from corresponding Patent Application No. PCT/US2016/017136, mailed Apr. 19, 2016, 4 Pages.

(Continued)

*Primary Examiner* — Cephia D Toomer
(74) *Attorney, Agent, or Firm* — Greenberg Traurig, LLP; Jonathan D. Ball

(57) ABSTRACT

Provided are nylon fibers having fire retardant agents dispersed therein and methods for manufacturing such fibers. The fire-retardant agents may comprise Tris(tribromophenyl) triazine and/or antimony trioxide. Fabrics made from such fibers are also provided.

20 Claims, 9 Drawing Sheets

Related U.S. Application Data continuation of application No. 15/019,501, filed on Feb. 9, 2016, now Pat. No. 10,385,479.

(60) Provisional application No. 62/113,687, filed on Feb. 9, 2015.

(56) References Cited

U.S. PATENT DOCUMENTS

| | | |
|---|---|---|
| 6,114,036 A | 9/2000 | Rinehart et al. |
| 10,131,757 B2 | 11/2018 | Ramappa et al. |
| 10,385,479 B2 | 8/2019 | Capwell et al. |
| 10,833,199 B2 | 11/2020 | Clifton et al. |
| 11,447,895 B2 | 9/2022 | Brookman et al. |
| 2005/0159552 A1 | 7/2005 | Reed et al. |
| 2007/0194289 A1 | 8/2007 | Anglin et al. |
| 2008/0139752 A1 | 6/2008 | De Schryver et al. |
| 2008/0233395 A1 | 9/2008 | Masuda |
| 2009/0043019 A1 | 2/2009 | Chang et al. |
| 2010/0047513 A1 | 2/2010 | Hagi |
| 2011/0071237 A1 | 3/2011 | Goode et al. |
| 2011/0152431 A1* | 6/2011 | Elkovitch ............... C08L 77/06 524/505 |
| 2012/0116009 A1 | 5/2012 | Bar-Yaakov et al. |
| 2019/0309443 A1 | 10/2019 | Brookman et al. |

OTHER PUBLICATIONS

International Preliminary Report on Patentability from corresponding Patent Application No. PCT/US2016/017136, mailed Aug. 15, 2017, 9 Pages.

* cited by examiner

FIRE RETARDANT NYLON FIBERS AND METHODS FOR MAKING THEM

CROSS-REFERENCE TO RELATED PATENT APPLICATION

This application is a continuation application under 35 U.S.C. § 120 to U.S. patent application Ser. No. 17/933,359, filed on Sep. 19, 2022, which is continuation application to U.S. patent application Ser. No. 17/124,598, filed Dec. 17, 2020, which is now U.S. Pat. No. 11,447,895, issued on Sep. 20, 2022, which is a continuation application to U.S. patent application Ser. No. 16/442,758, filed on Jun. 17, 2019, which is now U.S. Pat. No. 10,883,199, issued on Jan. 5, 2021, which is a continuation of U.S. Ser. No. 15/019,501, filed on Feb. 9, 2016, which is now U.S. Pat. No. 10,385,479, issued on Aug. 20, 2019, which claims priority to U.S. Provisional Patent Application Ser. No. 62/113,687, filed Feb. 9, 2015, the disclosures of each of which are incorporated herein by reference in its entirety.

FIELD OF INVENTION

The present invention relates generally to fire retardant nylon fibers. In particular, the invention relates to nylon fibers, such as nylon-6,6 and/or nylon 6, that are rendered fire retardant by incorporating into the molten nylon, prior to spinning into fibers, a combination of certain brominated compounds, such as tris(tribromophenyl) triazine, and a synergist, such as antimony trioxide. The invention further relates to fabrics, such as woven fabrics, comprising these fibers.

BACKGROUND

Flame retardant or flame-resistant fabrics are desirable in the textile industry for a variety of applications, and in particular as industrial and military clothing and equipment, including uniforms, tents and shelters. They are also found in a wide range of products in the consumer and medical fields.

There are currently two main ways of rendering fabrics fire-retardant or flame resistant. The first is to apply a fire-retardant coating or finish onto a fabric substrate. This approach suffers from the drawback that the weight of the fabric is increased, which may not be desirable where the fabric is to be worn in skin contact. Fabrics intended to be worn or carried by workers or soldiers is typically coated with a lighter weight coating to preserve some of the "hand" of the original fabric, but this limits the amount of fire retardancy that can be imparted. Fire-retardants can also be incorporated within the fabric by dipping the fabric in a bath of a fluid containing appropriated agents, however, this approach is generally not capable of making highly fire-retardant fabrics given the limited amount of material that can be deposited and retained on the surface of the fibers. Moreover, the additive typically is not durable to mechanical abrasion or laundering of the article. Attempts to impart greater durability to fire-retardant finishes often yield a fabric which is stiff and lacking the hand required for clothing. The conventional practice is to treat fabrics with both fire-retardant coatings and finishes. While it is possible to achieve good fire retardancy, this approach may negatively impact other performance characteristics, such as water repellency, moisture vapor transmission (breathability), tear strength, air permeability, flexibility, and hand and feel of the fabric. In fact, the addition of a coating or finish alone may affect performance attributes, such as breathability, air permeability, and weight. Generally, utilizing flame resistant coatings or finishes makes it more challenging to meet all performance specifications required for a technical fabric.

The second way of achieving a fire resistant fabric is to utilize inherently flame resistant fibers, such as meta-aramide, para-aramide, carbon, and rayon. For example, DuPont's NOMEX® fibers are meta-aramide-based fibers which are marketed as having good resistance to burning. One drawback to this approach is the expense associated with manufacturing and processing these specialty fibers relative to standard fibers, such as nylon-6 and nylon-6,6. Fabrics made from these fibers (e.g., NOMEX®) alone, or as blends, are difficult to process using typical textile materials and equipment. Moreover, additional performance requirements, such as water repellency, infrared reflectance, breathability, weight of fabric, tensile and tearing strength, abrasion resistance, strength and growth, flexibility and soft hand, are challenging to obtain when using inherently flame resistant fabrics. It is also difficult to dye and print these fabrics to proper color requirements. Special chemical auxiliaries and equipment frequently must be employed to process fabrics of inherently flame resistant fibers.

As such, there is a need for flame resistant fibers that are relatively inexpensive to produce. There is further a need for fabrics comprised of flame resistant fibers which are characterized by durable fire retardancy, without the need for heavy fire-retardant coatings. There is also a need for fire retardant fibers and fabrics that can be processed (e.g., woven, dyed, printed, calendared, washed, etc.) on conventional textile equipment. It is therefore an object of the invention to provide fibers comprising fire retardant agents that overcome one or more drawbacks of the prior art.

SUMMARY OF THE INVENTION

In accordance with the foregoing objectives, and others, the present invention is directed to fire resistant or retardant nylon fibers suitable for forming woven and non-woven fabrics. The fibers have dispersed within them a brominated organic fire-retardant chemical, such as a brominated aryl compound (e.g., tris(tribromophenyl) triazine) and a synergist (e.g., antimony trioxide) in amounts effective to render the nylon fibers resistant to ignition or combustion. The fibers may be formed into yarns, containing a plurality of the inventive nylon fibers, alone or blended with additional fibers (e.g., cotton, aramides, polyesters, carbon fibers, etc.). From the inventive yarns, woven and non-woven fabrics are made which are characterized by a reduced propensity to ignite or combust, even in the absence of fire-retardant coatings or additives applied to one or both surfaces of the fabric or embedded within the interstices of the fabric.

In one aspect of the invention, a method is provided for making fire retardant nylon fibers comprising dispersing a brominated organic fire-retardant chemical, such as a brominated aryl compound (e.g., tris(tribromophenyl) triazine), and a synergist (e.g., antimony trioxide) into a molten nylon polymer composition in amounts effective to render the nylon fibers formed therefrom resistant to ignition or combustion. In some implementation, the molten nylon polymer composition comprises nylon-6 and/or nylon-6,6 polymers. In some implementations, the antimony trioxide and brominated organic (e.g., tris(tribromophenyl) triazine) are typically present in an amount sufficient to provide a weight ratio of elemental Sb and Br (Sb:Br) of from about 1:1 to about 1:10 (e.g., from about 1:2 to about 1:5, or from about 1:3 to about 1:4) and/or an aggregate weight of elemental Sb and Br in said molten nylon polymer composition (or in the fibers prepared therefrom) of from about 0.1% to about 20% by weight (e.g., from about 1-10% by weight or from about 3-7% by weight, or from about 4-6% by weight) of the total weight of molten nylon polymer composition (or of the fibers). In some implementations, the brominated organic fire retardant, such as a brominated aryl compound (e.g., tris(tribromophenyl) triazine), and antimony trioxide are present, collectively, in an amount from about 0.1-20% (e.g., about 1-15%, or about 3-12%, or about 5-10%) by weight based on the weight of the molten nylon polymer composition (or of the fibers). In other implementations, the brominated organic fire retardant, such as a brominated aryl compound (e.g., tris(tribromophenyl) triazine), and antimony trioxide are present in the molten nylon polymer composition (or in the fibers) in a weight ratio of from about 2:1 to about 5:1 (or from about 3:1 to about 4:1). In other implementations, various additives, for example, a solution dye and/or an amount of a phosphorous-containing compound effective to promote charring of the resultant fabric formed from the fibers, may also be included in the molten mixture. Fibers are prepared from the molten mixture, for example, by passing the mixture through a spinneret and allowing it to solidify by cooling to form a fiber, and then optionally hot or cold drawing of the fiber modify the tensile strength and/or modulus. The fibers may then be incorporated into woven or non-woven fabrics in amounts sufficient to render the fabric fire retardant (e.g., passing the NFPA 701 Method 1 and/or Method 2, passing CPIA 84 Vertical Burn Test, self-extinguishing under the vertical flammability test of ASTM D6413, etc).

In one aspect of the invention, a method is provided for making fire-retardant nylon fibers. The method generally comprises the step of providing nylon-6 polymer having a brominated organic fire-retardant, such as a brominated aryl compound (e.g., tris(tribromophenyl) triazine), dispersed therein. The pellets typically, but not necessarily, are in the form of solid pellets of nylon-6 polymer. The solid pellets of nylon-6 are formed, for example, by dispersing the brominated organic fire-retardant (e.g., tris(tribromophenyl) triazine) into molten nylon-6 polymer (e.g., in the barrel of an extruder), and subsequently cooling said molten nylon-6 polymer and forming the cooled polymer into pellets. The nylon-6 pellets having the brominated organic fire-retardant (e.g., tris(tribromophenyl) triazine) dispersed therein are heated with nylon-6,6 polymer to form a molten mixture. This is typically carried out either by heating a blend comprising nylon-6,6 pellets and the nylon-6 pellets, or by adding the nylon-6 pellets to molten nylon-6,6 polymer. The resultant molten mixture, according to this embodiment, will comprise nylon-6, nylon-6,6, and brominated organic fire retardant (e.g., tris(tribromophenyl) triazine). Typically, a synergist (e.g., antimony trioxide), which enhances the fire-retardant properties of the brominated organic compound, is also included in the molten mixture. This may be accomplished, for example, either by incorporating the synergist into the nylon-6 pellets or by adding the synergist to the molten mixture of nylon-6, nylon-6,6, and brominated organic fire retardant (e.g., tris(tribromophenyl) triazine). Textile fibers may then be formed from the molten mixture, typically by extruding the mixture through a spinneret and hot or cold drawing of the resulting filament. In some implementations, additional additives (for example, an amount of a phosphorous-containing compound effective to promote charring of the resultant fabric on combustion) may also be included in the molten mixture, either by incorporating them into the nylon-6 pellets or by adding the phosphorous-containing compound to the molten mixture of nylon-6, nylon-6,6, and brominated organic fire-retardant (e.g., tris(tribromophenyl) triazine).

The nylon fibers of the invention may be of any dernier and may be formed into threads or yarns, alone or together with other natural or synthetic fibers, such as cotton, cellulosics, silk, wool, polyester, spandex, acrylics, polyamides, polyaramids, carbon fibers, and the like, to yield a composite fiber bundle (e.g., a yarn). The threads or yarns may be formed into woven, non-woven, knitted, and/or laminated fabrics.

These and other aspects of the invention will be better understood by reference to the following detailed description, drawings, and appended claims.

DETAILED DESCRIPTION

Figure 1:
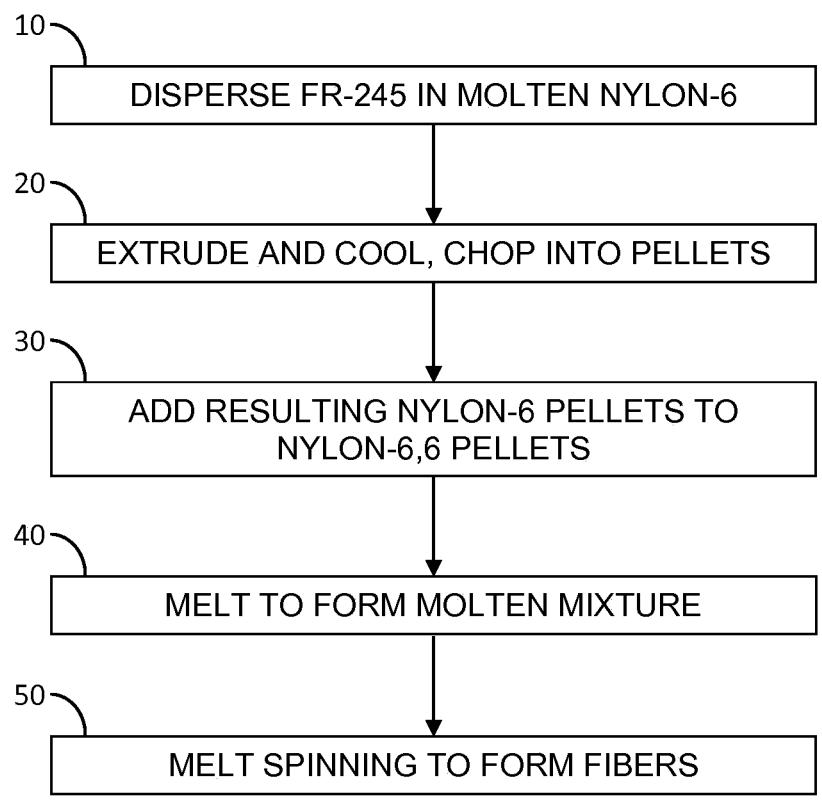
FIG. 1 is a flow diagram illustrating one embodiment of a method of making fire-retardant nylon fibers according to present invention.

All amounts provided in terms of weight percentage are relative to the entire composition unless otherwise stated. It will be understood that the total of all weight percentages in a given composition will not exceed 100%.

The invention is premised, in part, on the discovery that some, but not all, brominated organic fire-retardant compounds can be readily dispersed in molten nylon polymer without substantial decomposition and formed into fibers having excellent resistance to burning. Without wishing to be bound by any particular theory, it is believed that in order to effectively incorporate the brominated aryl compound into nylon fiber, the compound ideally meets two criteria: (1) it has a melting temperature near or below the melting temperature of the nylon polymer so that it can be better solvated by the polymer rather than remain in particulate form, and (2) it has a decomposition temperature well-above the melting point of the nylon polymer. In the regard, many of the conventional brominated organic compound used in fire-retardant textile coatings, for example decabromodiphenyl oxide (DECA) or FR-1210, are poor candidates for incorporation into nylon-6 or nylon-6,6 because the melting range is far above the melting points of nylon-6 and nylon-6,6 (e.g. 303-307° C. in the case of DECA). Without intending to limit the scope of the terms, "nylon-6" and "nylon-6-6," the melting temperature of nylon-6 is, in some embodiments, about 220° C. and the melting point of nylon-6,6 is, in some embodiments, about 265° C.

In one embodiment, the brominated organic fire-retardant compound of the invention comprises, consists essentially of, or consists of 2,4,6-tris (2,4,6-tribromophenoxy)-1,3,5-triazine (including the material having CAS No. 25713-60-4), also known as tris (tribromophenyl) triazine or tris (tribromophenyl) cyanurate or FR-245, and having the structure:

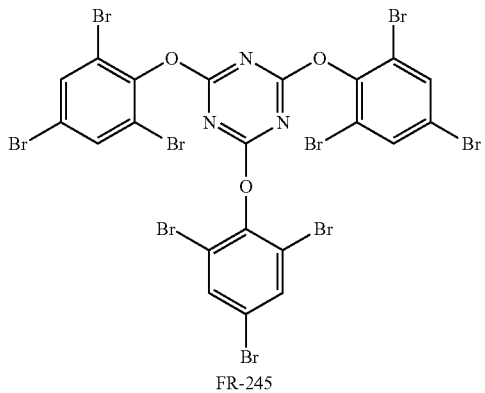

FR-245

Tris (tribromophenyl) triazine (FR-245) has a bromine content of about 67% (w/w), a melting point of about 230° C., and a thermal decomposition profile, as measured by thermogravimetric analysis (TGA), of about 2% weight loss at 360° C., about 5% weight loss at 385° C., and about 10% weight loss at 400° C. Tris (tribromophenyl) triazine may be used alone as the sole organic fire-retardant (or sole brominated organic fire-retardant) or in combination with other organic fire-retardants (including other brominated organics).

In some embodiments, the brominated fire-retardant of the invention comprises, consists predominantly of, or consists of: pentabromobenzyl acrylate (PBB-MA) (including the material identified by CAS No. 59447-55-1), also known as FR-1025M; poly(pentabromobenzyl acrylate) (PBB-PA) (including the material identified by CAS No. 155613-93-7), also known as FR-1808; Tris (tribromoneopentyl) phosphate (including the material identified by CAS No. 19186-97-1), also known as FR-370; and/or tetrabromobisphenyl A-bis (2,3-dibromopropyl ether) (including the material identified by CAS No. 21850-44-2). These brominated fire-retardants may be used alone or in combination with one another or in combination with tris (tribromophenyl) triazine or in combination with other organic fire-retardants (including brominated organics). Preferred brominated fire-retardants will have a bromine content of greater than 65% (w/w).

In some embodiments, the nylon-6 pellets (containing the brominated organic fire-retardant) and/or the molten nylon mixture from which the fibers are spun and/or the resultant fibers are essentially free of, or are free of, organic fire-retardants (including brominated organics) having a melting point greater than 235° C. or greater than 240° C., or greater than 250° C., or greater than 255° C., or greater than 260° C., or greater than 265° C., or greater than 270° C. or greater than 275° C., or greater than 280° C., or greater than 285° C., or greater than 290° C., or greater than 295° C., or greater than 300° C. The term "melting point," as used herein, may refer to the bottom of the melting range, the top of the melting range, or the middle of the melting range, depending on the context. Unless specified otherwise, the melting temperature refers to the bottom of the melting range.

In some embodiments, the nylon-6 pellets (containing the brominated organic compound) and/or the molten nylon mixture from which the fibers are spun and/or the resultant fibers are essentially free of, or are free of, organic fire-retardants (including brominated organics) having a decomposition profile (as measured by TGA) characterized by a 1% weight loss or more at or below 235° C., at or below 240° C., at or below 245° C., at or below 250° C. at or below 255° C., at or below 260° C., at or below 265° C., at or below 270° C., at or below 275° C., at or below 280° C., at or below 285° C., at or below 290° C., at or below 295° C., at or below 300° C., at or below 310° C., at or below 320° C., and/or characterized by a 2% weight loss or more at or below 235° C., at or below 240° C., at or below 245° C. at or below 250° C., at or below 255° C., at or below 260° C., at or below 265° C., at or below 270° C., at or below 270° C. at or below 280° C. at or below 285° C., at or below 290° C., at or below 295° C., at or below 300° C., at or below 310° C., at or below 320° C., at or below 330° C., at or below 340° C., or at or below 350° C., and/or characterized by a 5% weight loss or more at or below 235° C., at or below 240° C., at or below 245° C., at or below 250° C., at or below 255° C., at or below 260° C., at or below 265° C., at or below 270° C., at or below 275° C., at or below 280° C., at or below 285° C., at or below 290° C., at or below 295° C., at or below 300° C., at or below 310° C., at or below 320° C., at or below 330° C., at or below 340° C., at or below 350° C., at or below 360° C., or at or below 370° C., and/or characterized by a 10% weight loss or more at or below 235° C., at or below 240° C., at or below 245° C., at or below 250° C., at or below 255° C., at or below 285° C., at or below 290° C., at or below 295° C., at or below 300° C., at or below 310° C., at or below 320° C., at or below 330° C., at or below 340° C., at or below 350° C., at or below 360° C., at or below 370° C., at or below 380° C., or at or below 390° C. Ideally, the brominated organic fire-retardant will have less than 1%, or less than 0.5%, or less than 0.25%, or less than 0.1% weight loss at 220° C. and/or 265° C.

In some embodiments, the nylon-6 pellets (containing the brominated organic compound) and/or the molten nylon mixture from which the fibers are spun and/or the resultant fibers are essentially free of, or are free of, any additional organic fire-retardants (including brominated organics). In some embodiments, the fibers are free of reactive flame retardants (i.e., compounds that react with the reactive sites in the nylon polymer chain).

By "essentially free of" is meant that the amount of any such organic fire-retardants (including brominated organics) is below an amount needed to render a fabric consisting only of the inventive fibers flame retardant (as measured by passing NFPA 701 Method 1 and/or Method 2 and/or passing the CPIA 84 Vertical Burn Test), which may be less than about 10%, or less than about 5% or less than about 1%, or less than about 0.1% (w/w) of the weight of the brominated organic compound of the invention (e.g., tris(tribromophenyl) triazine).

In some embodiments, the fibers are essentially free of, or free, of one or all of the following: brominated diphenyl ethers (PBDEs), including without limitation, tetrabromo-diphenyl ether, pentabromo-diphenyl ether, and hexabromo-diphenyl ether, octabromo-diphenyl ether, decabromo-diphenyl ether; polybrominated biphenyls (PBBS); brominated aliphatic hydrocarbons, including brominated cyclohydrocarbons, such as hexabromocyclododecane (HBCD); brominated bisphenol-A compounds, including tetrabromobisphenol-A (TBBA); tribromoneopentyl alcohol (TBNPA); dibromoneopentyl glycol; brominated phenols, including tribromophenol; and brominated polystyrenes. In some embodiments, the fibers are essentially free of, or free of, polytetratrfluoroethylene, halogenated polyolefins, 4-vinylpyridine, polyhalo-substituted polyhydroxymethanon-apthalene dicarboxylic acids and their anhydrides, hydroxyalkyl-substituted polyhalopolyhydropolycyclic dicarboxylic acid imides, perchloropentacyclodecane (DECHLORANE®), 1,2 bis-(3,4-dibromocyclohexyl)-1,2-dibromoethane, chlorinated biphenyls, chlorinated benzenes and terphenyls, hexabromobenzene, chlorinated naphalenes, polynuclear aromatic halides, oligo(p-diisopropylbenzene), and/or chlorinated-substituted fluorenes. In some embodiments, the fibers are free of, essentially free of, chlorinated fire-retardants.

In some embodiments, the total organic fire-retardant (including brominated organics) content of the nylon-6 pellets (containing the brominated organic compound) and/or the molten nylon mixture from which the fibers are spun and/or the resultant fibers will consist of, consist, predominantly of, or will consist essentially of the brominated organic compound of the invention (e.g., tris(tribromophenyl) triazine). By "consist predominantly of" is meant that the brominated organic compound of the invention (e.g., tris(tribromophenyl) triazine) is the most abundant organic fire-retardant (including brominated organics) present. By "consist essentially of" is meant that additional organic fire-retardant (including brominated organics), if present, are at levels that do not measurable affect the fire retardancy of a fabric consisting of the inventive fibers as measured by NFPA 701 Method 1 and/or Method 2 and/or passing the CPIA 84 Vertical Burn Test, and may relate to an amount of additional organic fire-retardant (including brominated organics) less than about 10%, or less than about 5% or less than about 1%, or less than about 0.1% (w/w) of the weight of the brominated organic compound of the invention (e.g., tris(tribromophenyl) triazine). In some embodiments that major portion (i.e., more than 50% by weight) of the organic fire-retardant (including brominated organics) present in the nylon-6 pellets (containing the brominated organic compound) and/or the molten nylon mixture from which the fibers are spun and/or the resultant fibers themselves will be constituted by the brominated organic compound of the invention (e.g., tris(tribromophenyl) triazine).

In some embodiments, the fire-retardant fibers according to the invention (e.g., fibers spun from a polymer melt comprising, consisting essentially of, or having a major portion constituted by nylon polymers, such as nylon-6 and/or nylon-6,6) include (e.g., dispersed within the polymeric matrix of the fiber, as opposed to coating the surface of the fiber) amount of fire-retardant (e.g., from about 0.01-15% or from about 0.1-10% by weight, or from about 1-5% by weight), for example, from about 1-5 wt. % (e.g., about 1%, 2%, 3%, 4%, or about 5% by weight) tris (tribromophenyl) triazine, from about 1-5 wt. % (e.g., about 1%, 2%, 3%, 4%, or about 5%) tris(tribromoneopentyl) phosphate, and/or from about 1-5 wt. % (e.g., about 1%, 2%, 3%, 4%, or about 5%) antimony trioxide, based on the total weight of the fire-retardant fiber (prior to application of any surface treatments to the fiber).

In one aspect of the invention, a method is provided for making fire-retardant nylon fibers. The method generally comprises a step of providing nylon-6 polymer having a brominated organic fire-retardant (e.g., tris(tribromophenyl) triazine) dispersed therein, which will typically, but not necessarily, be in the form of solid pellets of nylon-6 polymer (e.g., having a longest dimension from about 1 micron to about 2 cm). In various implementations, at least 90%, at least 95%, or at least 99% of the polymeric content (or of the polyamide polymer content), of the pellets will be comprised of nylon-6 polymer. In some embodiments, the polymeric content of the nylon-6 pellets consists essentially of nylon-6, by which is meant the presence of additional polymers in amounts sufficient to alter the melting point of nylon-6 composition by more than ±10° C., or more than ±5° C., or more than ±1° C., are excluded. The solid pellets of nylon-6 polymer having the brominated organic fire-retardant (e.g., tris(tribromophenyl) triazine) dispersed therein are formed by dispersing the brominated organic fire-retardant into a molten nylon-6 polymer composition and subsequently cooling said molten nylon-6 polymer composition to form solid pellets.

This may be carried out, for example, in an extruder in which nylon-6 polymer raw material and brominated organic fire-retardant (e.g., tris(tribromophenyl) triazine) are added together or sequentially and melt extruded through a die to produce a tubular extrudate that is then cooled and chopped into pellets. The pellets may, for example, be generally cylindrical in shape and may have a longest dimension between about 100 microns and about 5 cm, or between about 1 mm and 3 cm, or between about 0.5 cm and about 2 cm.

Referring now to FIG. 1, one embodiment of the method of making fire-retardant nylon fibers according to the invention is illustrated. This embodiment employs tris(tribromophenyl) triazine (also known as FR-245) as the sole brominated organic fire-retardant, however, it will be understood that the method is applicable to any suitable brominated organic fire-retardant according to the invention. As shown at step 10, the method begins by dispersing FR-245 in molten nylon-6. There is essentially no limitation on how this step is carried out, however, it is usually done by passing chips or pellets of raw or compounded (i.e., having additives already included) nylon-6 polymer through an extruder, as illustrated at step 20. The extruder may be any extruder used to process plastics, such as a screw extruder, twin screw extruder, etc. The FR-245 may be pre-blended with the nylon-6 before it is charged to the extruder or may be added in continuous fashion into the barrel of the extruder, for example, through one or more hoppers connected to a port on the extruder barrel. The FR-245 may be added to the nylon-6 polymer as a powder, a melt (by preheating it to a liquid), or as a solution (by dissolving in a suitable solvent). The nylon-6 raw material may be in the form of a masterbatch (i.e., including additives, such as colorants, opacifiers, fillers, UV stabilizers, etc.) which can take the form of pellets, beads, chips, granules, etc. The nylon-6 raw material may comprise at least about 90%, or at least about 95%, or at least about 98%, or at least about 99%, or at least about 99.9% by weight nylon-6 polymer. In some embodiments, the nylon-6 polymer raw material will comprise about 100% by weight nylon-6. In some embodiments, the nylon-6 polymer raw material will be "essentially free of additives," meaning that no additional substances are deliberately added to the nylon-6 polymer and the only additional materials present are contaminants from its synthesis and processing. After the FR-245 and nylon-6 polymer are melted and mixed, preferably substantially homogenously, for example in an extruder, the extrudate may be passed through a die at the exit of the extruder to produce an elongated semisolid extrudate (e.g., tube, noodle, or ribbon shaped), which may have a diameter or width of about 5 microns to about 10 cm (or from about 0.1 mm to about 3 cm or from about 1 mm to about 1 cm, etc.). The shaped extrudate is then cooled, for example, with water or air, and may be chopped into pellets, flakes, chips. granules, etc., (collectively, "pellets") prior to or after cooling. The pellets may, for example, have a length (e.g., longest dimension) between about 5 microns and about 10 cm, or between about 0.1 mm and about 3 cm, or between about 1 mm and about 1 cm. The precise dimensions of the nylon-6 pellets are not critically important, although smaller pellets may dissolve/melt faster when subsequently added to molten nylon-6,6 polymer. The term "pellet." as used herein, is not intended to restrict the solid particles to any particular shape, but rather is meant to describe solid particles or pieces having dimensions generally in conformance with the dimensions described herein, such that a plurality of solid pellets is flowable through hoppers and the like. The pellets of nylon-6 (having the FR-245 dispersed therein) are then added to nylon-6,6 polymer in step 30. There is essentially no restriction on how the nylon-6 pellets are combined with nylon-6,6 polymer in step 30. For example, the nylon-6 pellets may be combined with pellets of nylon-6,6 in a suitable blender to form a substantially homogenous physical admixture. The admixture may then be melted together in step 40. Alternatively, the nylon-6 pellets may be added to molten nylon-6,6 to melt the nylon-6, such that steps 30 and 40 are carried out simultaneously. Similarly, the nylon-6 pellets may be melted prior to addition to molten nylon-6,6. The amount of nylon-6 pellets added to the nylon-6,6 is not particularly restricted and will be determined based on the desired characteristics of the resulting fibers. In some embodiments, the weight ratio of the nylon-6 polymer to the nylon-6,6 polymer will be between about 1:1,000 to about 1:1, more typically between about 1:500 to about 1:2 or from about 1:100 to about 1:1. In some embodiments, the weight ratio of nylon-6 polymer to nylon-6,6 polymer will be from about 1:50 to about 1:3 or from about 1:25 to about 1:4, or from about 1:20 to about 1:5.

The melting step 40, may be carried out in a heated receptacle, bin, chamber or the like or on a heated surface (e.g., the heated grid in a grid spinning apparatus). In one embodiment, the melting step 40 is carried out, at least in part, in a screw feeder that passes the molten material through one or more heated zones and into the spinneret. Typically, the screw feeder is part of a single- or twin-screw extruder which receives the nylon-6,6 feedstock (solid pellets, flakes, masterbatch, etc.) from a hopper and melts and mixes it as the material is conveyed by the screw. The nylon-6,6 feedstock may by introduced simultaneously with the nylon-6,6 pellets (containing the brominated organic compound) from a single hopper, or the nylon-6 and nylon-6,6 pellets may be introduced into the extruder from separate hoppers. The pellets are melted by the heat generated by the screw and/or by passing through one or more heated zones of the extruder. Ideally, the molten mixture comprises a substantially homogenous mixture of nylon-6, nylon-6,6, and the brominated organic (e.g., tris(tribromophenyl) triazine), wherein the brominated organic is substantially dispersed or dissolved in the polymer such that the presence of particulates of the brominated organic is limited or eliminated. The molten mixture may optionally be passed through a sand filter or the like before melt spinning to form fibers in step 50. During melt spinning, the molten material is forced through one or more holes on a spinneret plate on a spin head. In some embodiments, the molten mixture is forced, optionally via a pump, through plurality of holes typically having a diameter (or widest dimension in the case of non-circular cross-sections) of between about 1-10 mils (thousandths of inch). Prior to entering the spinneret plate, the molten material may first be forced through a filter to remove particulates of predetermined size. The plurality of extruded filaments exiting the plurality of holes on the spinneret plate are collected and optionally wound together under air, quench gas, or water cooling in a cooling chamber to form a fiber. Once the fibers are cooled and harden, they can be wound onto bobbins. The cooled fibers typically are then drawn between a pair of optionally heated rolls or godets to stretch the fibers, for example, they may be stretched anywhere from 2× to 5× the original length to improve or alter the tensile strength, modulus, and other properties of the fibers. Drawing may also alter the physical structure of the fibers by aligning crystalline domains along the direction of elongation. The fibers that result may be multipurpose nylon threads that can be used for a variety of purposes.

Figure 2:
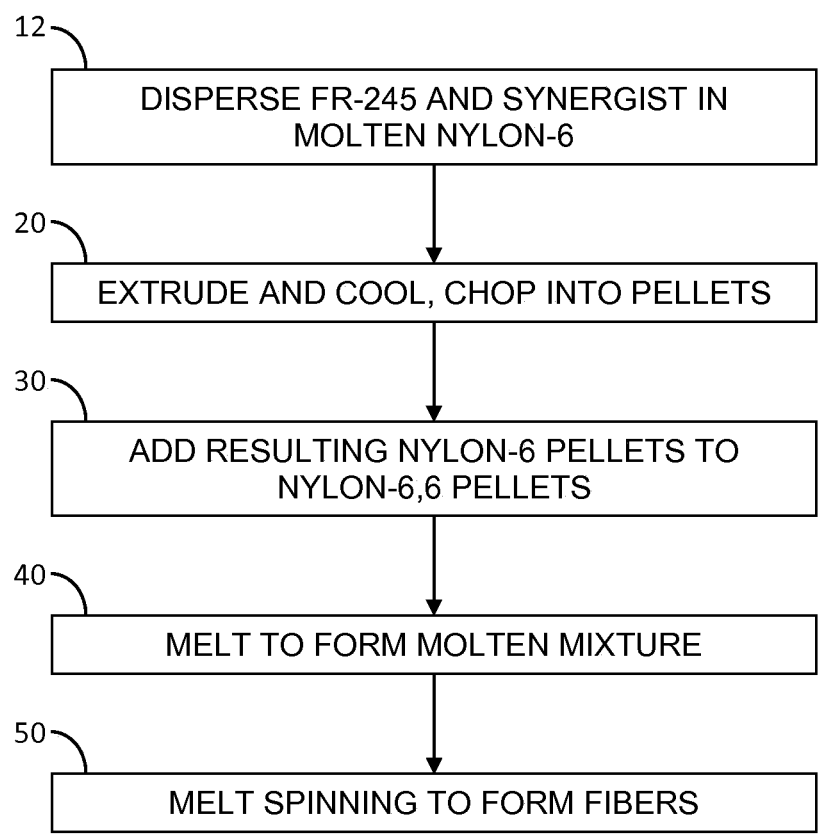
FIG. 2 is a flow diagram illustrating another embodiment of a method according to the present invention in which a synergist is incorporated into nylon-6 pellets along with a FR-245 brominated organic fire-retardant.

Referring now to FIG. 2, another embodiment of the invention is illustrated in which a synergist is incorporated into the nylon-6 pellets along with the FR-245 brominated organic fire-retardant in step 12. The synergist may be any material, typically inorganic oxides and hydroxides, that permit the brominated organic fire-retardant to be used at lower levels than would otherwise be necessary to achieve the same degree of fire retardancy. Suitable synergists include, without limitation, antimony trioxide, antimony pentoxide, sodium antimonite, calcium metaborate, aluminum hydroxide (ATH), barium borate, to name a few. The preferred synergist is antimony trioxide ($Sb_2O_3$). In one embodiment, the antimony trioxide has a median particle size (on a volume basis) of about 0.01 to about 10 microns, or from about 0.1 to about 1 micron, or from about 0.2 to about 0.8 microns, or from about 0.3 to about 0.6 microns, as measured, for example, by a laser diffraction particle size analyzer. In particular, the combination of antimony trioxide and tris(tribromophenyl) triazine is particularly suitable in the practice of the invention. The antimony trioxide synergist and brominated organic (e.g., tris(tribromophenyl) triazine) are typically present in an amount sufficient to reduce the propensity of the resultant fiber to combust. This may include, for example, a weight ratio of elemental Sb to Br (i.e., Sb:Br) of from about 1:1 to about 1:10, or from about 1:2 to about 1:5, or from about 1:3 to about 1:4. The aggregate weight of elemental Sb and Br in the molten nylon polymer composition (or in the resulting filaments or fibers prepared therefrom) is typically from about 0.1% to about 20% by weight, or from about 1-10% by weight, or from about 3-7% by weight, or from about 4-6% by weight, of the total weight of molten nylon polymer composition (or of the resulting filaments or fibers formed therefrom). The brominated organic fire-retardant (e.g., tris(tribromophenyl) triazine) and antimony trioxide are present, collectively, in an amount from about 0.1-20%, or about 1-15%, or about 3-12%, or about 5-10% by weight based on the weight of the molten nylon polymer composition (or of the resulting filaments or fibers formed therefrom). In some embodiments, the brominated organic fire-retardant (e.g., tris(tribromophenyl) triazine) and antimony trioxide are present in the molten nylon polymer composition (or in the resulting filaments or fibers) in a weight ratio of from about 1:1 to about 10:1, or from about 2:1 to about 5:1, typically from about 3:1 to about 4:1. The remainder of the process in FIG. 2 can be carried out, for example, as described for the process of FIG. 1.

Figure 3:
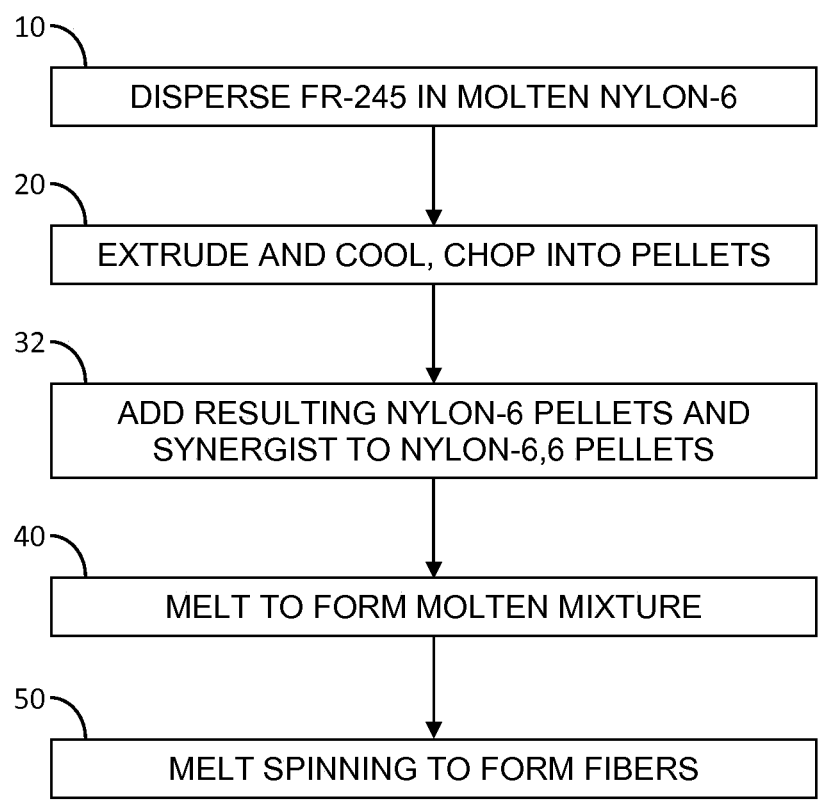
FIG. 3 is a flow diagram illustrating yet another embodiment according to the present invention where a synergist is added with nylon-6 pellets to nylon-6,6 pellets.
Figure 4:
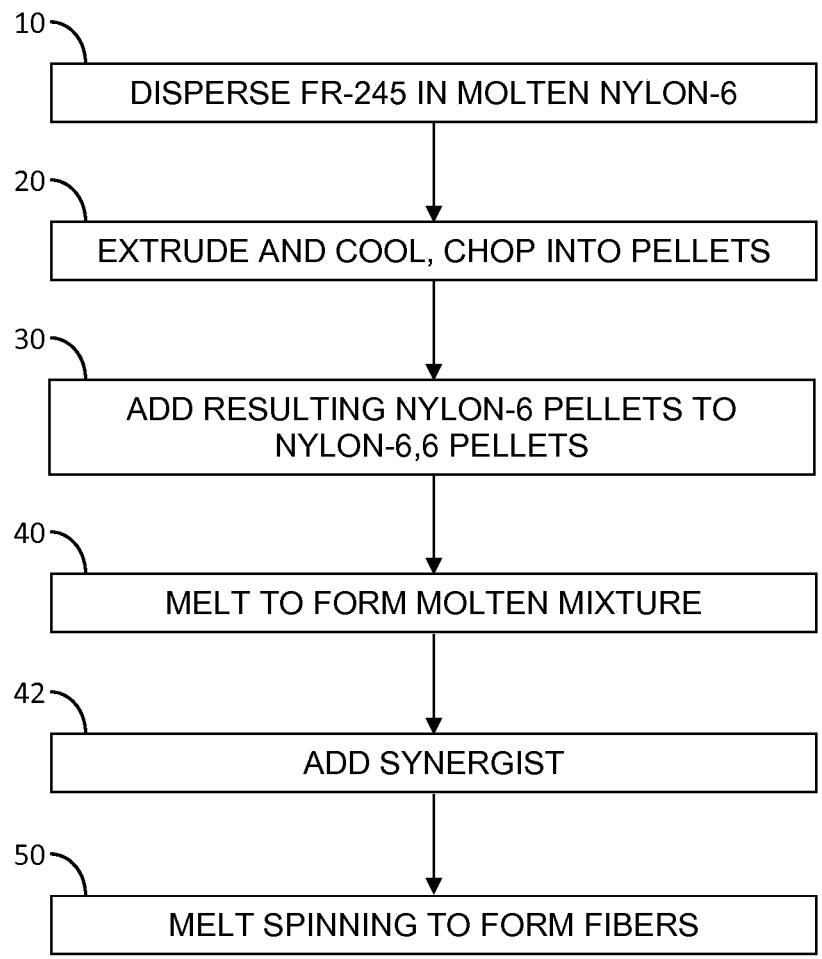
FIG. 4 is a flow diagram illustrating another embodiment of a method according to the present invention where a synergist is added to a molten mixture of nylon-6, nylon-6,6, and a brominated organic fire-retardant.

Another embodiment of the invention is illustrated in FIG. 3. This embodiment differs from that of FIG. 2 only in that the synergist (e.g., antimony trioxide) is instead added with the nylon-6 pellets to the nylon-6,6 pellets, either prior to melting in the melt spinning process, or during the melt spinning process. For example, the synergist may be blended with the nylon-6 pellets, or blended with the nylon-6,6 feedstock, or both, before being fed into the melt spinning apparatus (e.g., prior to addition into the screw extruder). In the embodiment illustrated in FIG. 3, the synergist is blended with the nylon-6 pellets and nylon-6,6 pellets, as shown in step 32, prior to or simultaneous with melting step 40. Alternatively, the synergist (e.g., antimony trioxide) may be introduced into the extruder or mixing/heating chamber of the melt spinning apparatus through a separate hopper, inlet, or the like. In such an embodiment, the synergist will typically be added to the molten mixture of nylon-6, nylon-6,6, and brominated organic fire-retardant, as illustrated in step 42 of FIG. 4. In any event, the synergist will be homogenously mixed with the molten nylon-6, nylon-6,6, and brominated organic fire-retardant (e.g., tris(tribromophenyl) triazine) mixture prior to being forced through the hole(s) in the spinneret plate.

Figure 5:
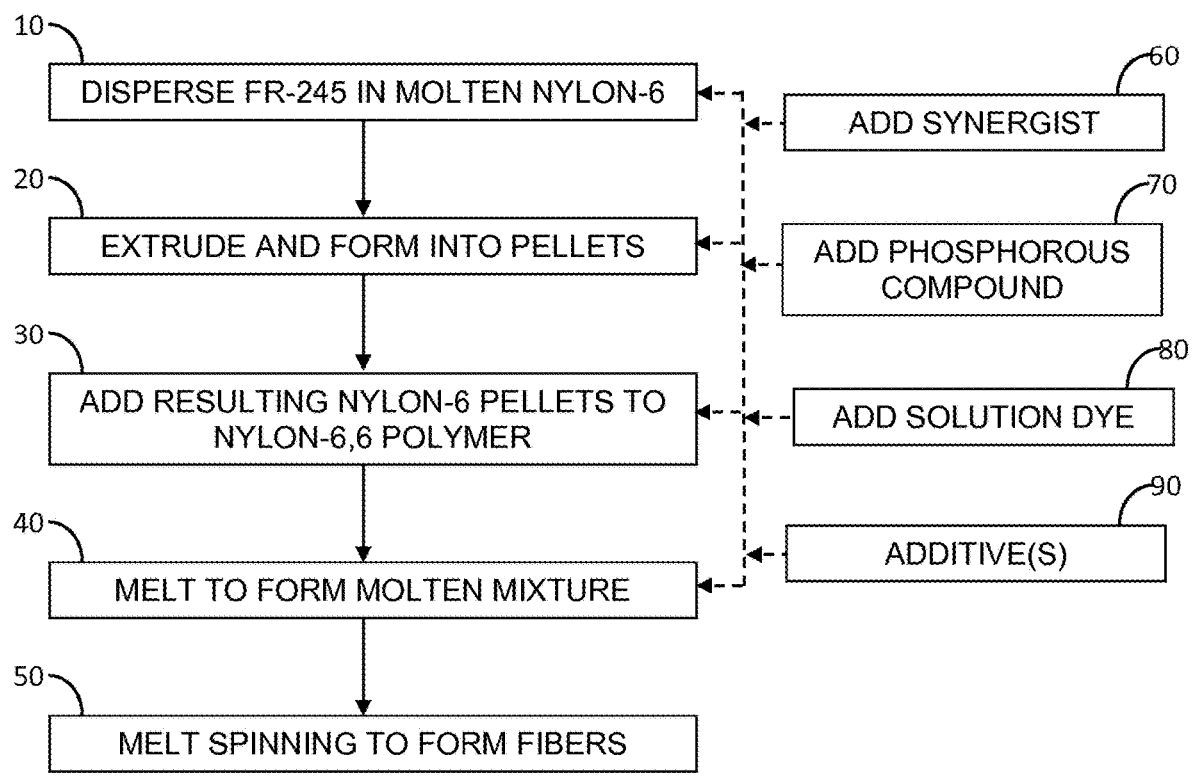
FIG. 5. is a flow diagram illustrating an embodiment of a method of the present invention.

Another embodiment of the method according to the invention is illustrated in FIG. 5. The process of steps 10-50 can be carried out generally as described above for the process of FIG. 1. However, it will be understood that steps 30 and 40 can be performed sequentially, by first blending the nylon-6 pellets and nylon-6,6 pellets in step 30, or simultaneously, by blending the pellets during the melting step 40. Alternatively, the nylon-6 pellets may be added to already molten nylon-6,6, or vice versa. In FIG. 5, the optional (but preferred) addition of a synergist at step 60, may be carried out by including the synergist (e.g., antimony trioxide) in the molten nylon-6 to incorporate it into the nylon-6 pellets. Steps 10 and 20 are typically performed simultaneously; that is the brominated organic fire-retardant is typically dispersed in the molten nylon in the barrel of an extruder. However, it is also possible to blend the synergist with the pellets of nylon-6 that are formed after extrusion in step 20. Likewise, the synergist may be added to the molten nylon-6,6 in step 30 (e.g., together with the nylon-6 pellets) or step 40 (e.g., to the molten mixture). An amount of a phosphorous-based fire-retardant (step 70), a solution dye (step 80), and/or one or more additional additives (step 90) optionally may be included in the same manner as discuss for the addition of the synergist (e.g., at any of steps 10-50). The optional amount of a phosphorous-based fire-retardant (step 70), a solution dye (step 80), and/or one or more additional additives (step 90) may be added in the same step or at different steps 10-50 from one another.

Phosphorous-based flame retardant include, without limitation, organophosphorus compounds such as organophosphates, including without limitation, triphenyl phosphate (TPP), resorcinol bis(diphenylphosphate) (RDP), bisphenol A diphenyl phosphate (BADP), and tricresyl phosphate (TCP); phosphonates, including without limitation, dimethyl methylphosphonate (DMMP); and phosphinates including without limitation, aluminum diethyl phosphinate. In some embodiment, the phosphorous-based flame retardant contains both phosphorus and a halogen (e.g., bromine and/or chlorine), including without limitation, tris(2,3-dibromopropyl) phosphate, and chlorinated organophosphates, including tris(1,3-dichloro-2-propyl) phosphate (TDCPP) and tetrekis(2-chlorethyl)dichloroisopentyldiphosphate (V6). In other embodiments, the phosphorous-based flame retardant may be tri(trisbromoneopentyl)phosphate having the structure:

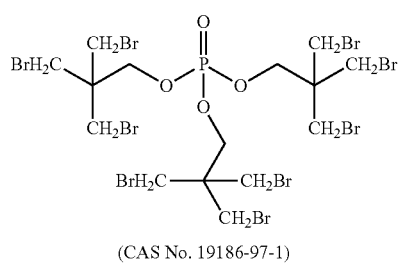

(CAS No. 19186-97-1)

In other embodiments the phosphorous-based flame retardant may comprise melamine mono phosphate, melamine polyphosphate, aluminum diethylphosphinate, and zinc or magnesium borophosphate. Phosphorous-based flame retardants are generally described in van der Veen, I; de Boer, J, "Phosphorus flame retardants: Properties, production, environmental occurrence, toxicity and analysis," *Chemosphere* 88 (10): 1119-1153 (2012); and Weil, E D; Levchik, S V, "Flame Retardants for Plastics and Textiles: Practical Applications," Munich: Carl Hanser Verlag. p. 97 (2009), the disclosures of which are hereby incorporated by reference. Combinations of any of these phosphorous-based flame retardants may also be included. The phosphorous-based flame retardant may be included in the fibers in an amount from about 0.0001% to about 5% by weight, more typically from about 0.001% to about 2.5% by weight or from about 0.1% to about 1% by weight of the molten mixture from which the fiber is obtained (or based on the weight of the resultant fiber itself).

In other embodiments, the molten mixture from which the fiber is obtained (or the resultant fiber itself) is free of phosphorous-based flame retardants. By stating that the fiber itself is free of phosphorous-based flame retardants is meant that no phosphorous-based flame retardants are dispersed within the fiber, although it does not necessarily preclude later treatment of the surfaces of the fibers with phosphorous-based flame retardants.

The dye is usually a solution dye which may be, for example, a basic dye, an acid dye, a disperse dye, a vat dye, a reactive dye, and/or a direct dye, to name a few. Typically, the dye is an acid dye. Suitable acid dyes include, without limitation, azobenzene-based or "azo" dyes, anthraquinone-based dyes, premetalized dyes, and triphenylmethane-based dyes. It has been found that the solution dye can be included within the fibers to achieve deep hues and colorfastness. The fiber may also be treated with dyes after they are made or woven into fabric according to conventional practice. It is believed that the presence of the fire-retardant brominated organic and synergist do not materially impair the capacity of the fiber to take up and retain dye.

Additional additives that may be included in the nylon-6 pellets, or the molten mixture of nylon-6 and nylon-6,6, include without limitation, fillers, pigments, and opacifiers (e.g., titanium dioxide, calcium carbonate, etc.), UV-stabilizers, anti-microbial agents, bleaching agents, optical brighteners, antioxidants, pigments, dyes, soil repellants, stain repellants, nanoparticles, water repellants, and the like. The collective weight of the solution dyes, if present, and all additives will typically range from about 0.0001% by weight to about 10% (or 0.001-5% or about 0.01-1% by weight of the molten mixture of nylon-6 and nylon-6,6 (or based on the weight of the fiber or filament made therefrom).

Figure 6:
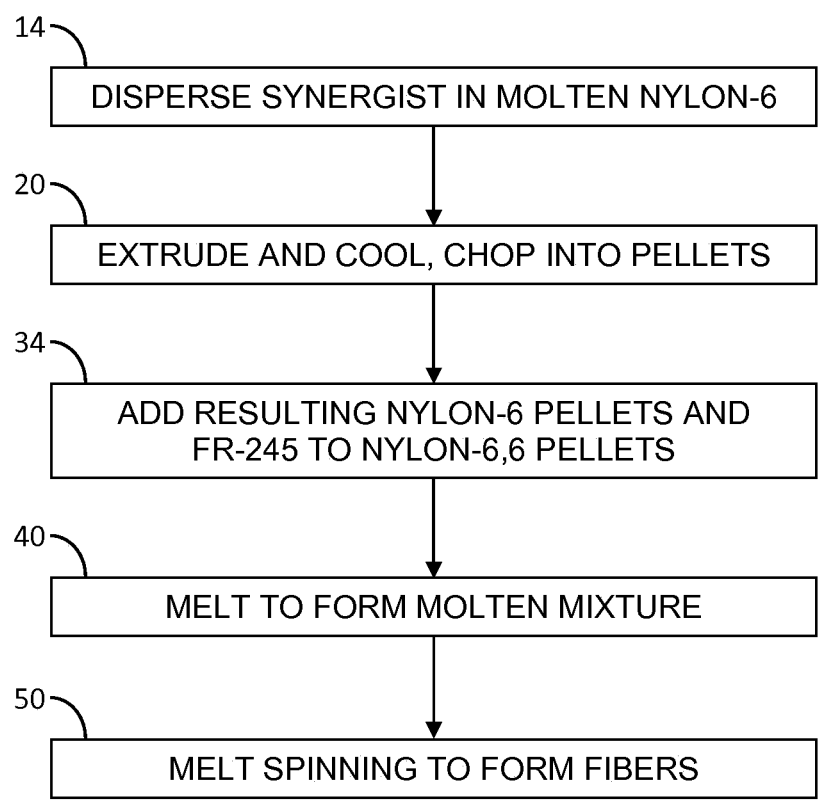
FIG. 6. is a flow diagram illustrating yet another embodiment of a method according to the present invention in which a synergist is added to the nylon-6 and incorporated into the nylon 6 pellets.
Figure 7:
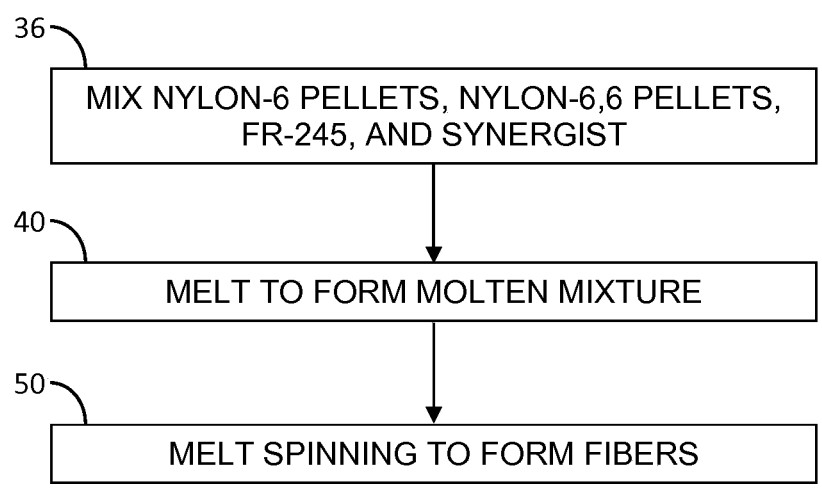
FIG. 7. is a flow diagram illustrating yet another embodiment of a method according to the present invention in nylon-6 pellets, nylon-6,6 pellets, a synergist, and a brominated organic fire-retardant are combined and then extruded to melt and homogenously mix the mixture prior to melt spinning.

Referring now to FIG. 6, a variant of the invention is illustrated in which the synergist (e.g., antimony trioxide) is added to the nylon-6 and incorporated into the nylon-6 pellets in step 14 in generally the same manner as described above. The brominated organic fire-retardant (e.g., FR-245) is introduced at step 34, for example by blending it with nylon-6 pellets and nylon-6,6 pellets and extruding to melt and homogenously mix the mixture in step 40 prior to melt spinning 50. In yet another variant, as illustrated in FIG. 7, nylon-6 pellets, nylon-6,6 pellets, a synergist (e.g., antimony trioxide), and a brominated organic fire-retardant (e.g., FR-245) are combined at step 36 and extruded to melt and homogenously mix the mixture in step 40 prior to melt spinning 50. Step 36 may comprise making a physical blend, making a substantially homogenous physical blend, an/or aggregating the materials in any manner. Alternatively, the fire-retardant and the synergist can be added to molten nylon-6 and/or molten nylon-6,6, for example, from suitably arranged hoppers at one or more locations along an extruder barrel. What is important is that the fire-retardant and the synergist become dispersed throughout the molten matrix of nylon-6 and/or nylon-6,6.

In some embodiments of the invention, the polymeric content of the spun fibers will comprise nylon-6 in an amount of at least about 50% by weight, or at least about 60% by weight, or at least about 70% by weight, or at least about 80% by weight, or at least about 90% by weight, or at least about 95% by weight, or at least about 98% by weight or at least about 99% by weight, or about 100% by weight of the fiber. In some embodiments, the polymeric content of the spun fibers may consist of nylon-6, or consist essentially of nylon-6, by which is meant that any additional polymers are collectively present in an amount of less than about 5% by weight of the fiber, or less than about 2.5% by weight of the fiber, of less than about 1% by weight of the fiber, or less than about 0.5% by weight of the fiber. In some embodiments, nylon-6 will be the only nylon polymer in the fiber. In some embodiments, nylon-6 will be the only polyamide polymer in the fiber.

Figure 8:
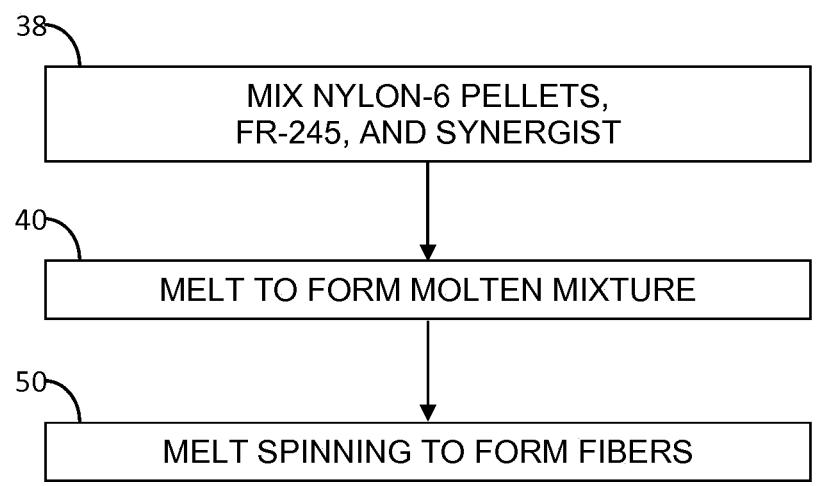
FIG. 8. is a flow diagram illustrating an additional embodiment of a method according to the present invention in which nylon-6 pellets are blended with a brominated organic fire-retardant and a synergist and subsequently melted and formed into fibers.

One embodiment of the invention is illustrated in FIG. 8 in which nylon-6 pellets are blended with a brominated organic fire-retardant (e.g., FR-245) and a synergist (e.g., antimony trioxide) at step 38 and subsequently melted in step 40 and formed into fibers at step 50. Alternatively, the brominated organic fire-retardant (e.g., FR-245) and/or a synergist (e.g., antimony trioxide) may be added to molten nylon-6, for example in the barrel of an extruder or other suitable heating chamber. Again, what is important is that a substantially homogenous dispersion of brominated organic fire-retardant (e.g., FR-245) and synergist (e.g., antimony trioxide) in the molten nylon-6 is formed prior to fiber formation in step 50 in order to ensure that the resultant fibers have the fire-retardant agents dispersed generally homogenously along their length.

Figure 9:
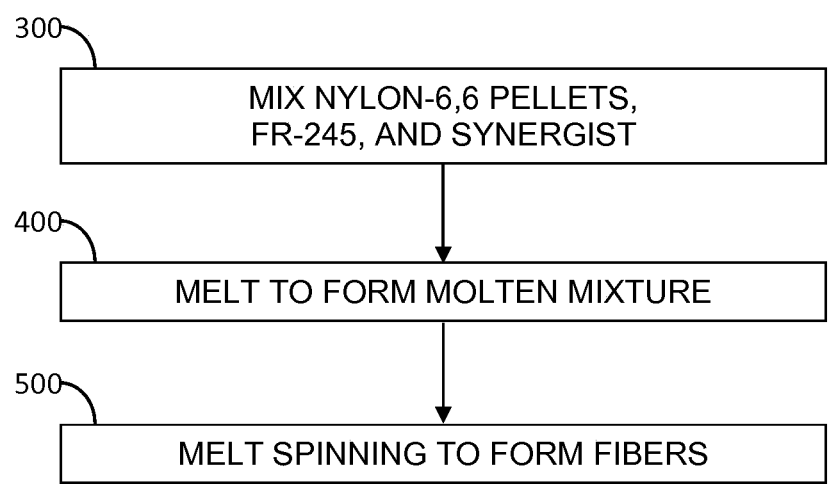
FIG. 9. is a flow diagram illustrating an additional embodiment of a method according to the present disclosure of which nylon-6 pellets are blended with a brominated organic fire-retardant and a synergist and subsequently melted and formed into fibers.

FIG. 9 illustrates a related embodiment in which nylon-6,6 pellets are blended with a brominated organic fire-retardant (e.g., FR-245) and a synergist (e.g., antimony trioxide) at step 300 and subsequently melted in step 400 and formed into fibers at step 500, generally in the same manner as described herein. Alternatively, the brominated organic fire-retardant (e.g., FR-245) and/or a synergist (e.g., antimony trioxide) may be added to molten nylon-6,6 polymer for example in the barrel of an extruder or other suitable heating chamber. Again, what is important is that a substantially homogenous dispersion of brominated organic fire-retardant (e.g., FR-245) and synergist (e.g., antimony trioxide) in the molten nylon-6,6 is formed prior to fiber formation in step 500 in order to ensure that the resultant fibers have the fire-retardant agents dispersed generally homogenously along their length.

In other embodiments of the invention, the polymeric content of the spun fibers will comprise nylon-6,6 in an amount of at least about 50% by weight, or at least about 60% by weight, or at least about 70% by weight, or at least about 80% by weight, or at least about 90% by weight, or at least about 95% by weight, or at least about 98% by weight or at least about 99% by weight, or about 100% by weight of the fiber. In some embodiments, the polymeric content of the spun fibers may consist of nylon-6,6, or consist essentially of nylon-6,6, by which is meant that any additional polymers are collectively present in an amount of less than about 5% by weight of the fiber, or less than about 2.5% by weight of the fiber, of less than about 1% by weight of the fiber, or less than about 0.5% by weight of the fiber. In some embodiments, nylon-6,6 will be the only nylon polymer in the fiber. In some embodiments, nylon-6,6 will be the only polyamide polymer in the fiber.

In all embodiments of the invention, it is contemplated that some inhomogeneity about the cross-section of the resultant fibers may result due to physical changes in the nylon structure from center to surface on drawing or stretching. Thus, the concentration of brominated organic fire-retardant (e.g., FR-245) and/or a synergist (e.g., antimony trioxide) may comprise a gradient from the center of the fiber to the surface. For example, there may be a relatively greater concentration or density of brominated organic fire-retardant (e.g., FR-245) and/or a synergist (e.g., antimony trioxide) at or near the center of the fiber's cross-section relative to the perimeter or surface. Alternatively, there may be lesser concentration or density of brominated organic fire-retardant (e.g., FR-245) and/or a synergist (e.g., antimony trioxide) at or near the center of the fiber's cross-section relative to the perimeter or surface. In other embodiments, the brominated organic fire-retardant (e.g., FR-245) and/or synergist (e.g., antimony trioxide) may be distributed evenly across the cross-section of the fiber.

In some embodiments, the fibers comprising brominated organic fire-retardant (e.g., FR-245) and/or synergist (e.g., antimony trioxide) have the same or substantially the same (e.g., ±5% on a weight basis) degree of crystallinity as an otherwise identical fiber that lacks the brominated organic fire-retardant (e.g., FR-245) and/or synergist (e.g., antimony trioxide). In some embodiments, the tensile strength of the fibers of the invention will be the same or substantially the same (e.g., ±5%) as an otherwise identical untreated fiber. In other embodiments, the tensile strength of the fibers of the invention will be within ±50%, or within ±40%, within ±30%, within ±20%, within ±10%, within ±5%, within ±2.5%, or within ±1% of the tensile strength of an otherwise identical untreated fiber.

In some embodiments, the nylon-6 and nylon-6,6 polymers may include, or may be free of, co-monomers comprising fire-retardant moieties included within the polymer chains. In some embodiments, the fibers may include, or may be free of, non-halogenated fire-retardants, including those described in WO2012/040332 to Sarzotti, et al., the disclosure of which is hereby incorporated by reference. In other embodiments, the fibers of the invention may include, or may be free of, aromatic or partially aromatic polyamides, including those described in WO2012/040332 to Sarzotti, et al., the disclosure of which is hereby incorporated by reference.

The fibers of the invention may be formed into threads or yarns consisting only of the inventive fibers or comprising blends of the inventive fibers with other fibers, including without limitation, cotton fibers and other natural fibers (e.g., wool, silk, etc.) and synthetic fibers, such as modified cellulosic fibers (e.g., rayon), polyester fibers, polyamide fibers, acrylic fiber, spandex fibers, and carbon fibers, to name a few. In some embodiments, the inventive fibers are formed into threads or yarns together with an inherently fire-resistant fiber such as a polyaramid (e.g., Nomex).

The threads or yarns may be formed into woven, non-woven, knitted, and/or laminated fabrics. The fabrics can then further be treated with surface coatings or impregnations to alter one or more chemical or physical properties of the fabrics. In one embodiment, the fabric will include a surface coating (applied by a knife blade, roll coater, transfer coat, or the like) or impregnation which will include at least one additional agent for imparting resistance to combustion, smoking, dripping, etc.). Surface coating include, without limitation, coating with polymers, such as silicone and/or polyurethane polymers. The agent may be, without limitation, a fire-retardant (e.g., an organic or inorganic halogenated fire-retardant), a metal oxide or hydroxide (e.g., aluminum trihydroxide (ATH), antimony trioxide, etc.), an intumescent agent, a char-promoting agent, a phosphorous-containing agent, or the like. In some embodiments, the fabric may be coated with an inherently fire-retardant coating, such as a polyurethane polymer that includes fire-retardant monomers or which have fire-retardant moieties (e.g., halogenated aryl) grafted to the polymer backbone. In other embodiments the coating or impregnation may comprise a water-repellant (e.g., silicone), a durable water-repellant (DWR), such as a fluorochemical, a water-soluble particle, a UV stabilizer, and light (e.g., UV, IR, etc.) absorbers or reflectors, an antimicrobial agent, antistatic agents, hand-altering agents, anti-soiling agents, colorants, and the like.

In some embodiments, the fabrics will be free of surface coatings. In some embodiments, the fabrics will be free of surface coatings that alter the porosity, MVTR (moisture vapor transmission rate), water-repellency (as measured by water droplet contact angle), water-repellency (as measured by spray test AATC Method 22), water-proofness (as measured by the Suter hydrostatic head test), tear strength (as measured by Mullens Burst Test), elongation, and/or flexibility of the fabric, or free of surface coatings that alter the porosity, MVTR, water-repellency (contact angle), water-repellency (spray test), water-proofness, tear strength, elongation, and/or flexibility of the fabric by more than ±5%. In some embodiments, the fabrics will comprise a surface coating of less than about 10 oz/yd, or less than about 8 oz/yd, or less than about 6 oz/yd$^2$, or less than about 2 oz/yd$^2$, or less than about 1 oz/yd$^2$, or less than about 0.8 oz/yd$^2$, or less than about 0.5 oz/yd$^2$, or less than about 0.3 oz/yd$^2$. In one embodiment, a fabric according to the invention will be a woven fabric having a DWR impregnation of a fluorochemical and/or a surface coating of a polyurethane polymer, typically in an amount less than about 0.8 oz/yd$^2$, or less than about 0.5 oz/yd$^2$, or less than about 0.3 oz/yd$^2$.

In some embodiment, the weight of all impregnations and surface treatments will collectively comprise less than about 100%, or less than about 75%, or less than about 50%, or less than about 25%, or less than about 20%, or less than about 15%, or less than about 10%, or less than about 5%, or less than about 2.5% by weight of the weight of the untreated fabric.

The fabric may be printed with a variety of inks, pigments, dyes, colorants, etc. In some embodiments, the fibers or the fabric comprising the fibers may by dyed a base shade or hue. In some embodiments, the base shade or hue will be characterized as having an L*, a, and/or b value within about ±10, or ±5, or ±1 of the L*, a, and/or b value of an otherwise identically dyed fiber or fabric that does not have a brominated organic fire-retardant (e.g., FR-245) and synergist (e.g., antimony trioxide) dispersed within the fiber in accordance with the present invention.

In some embodiments, the fabrics will be free of surface coatings that alter the MVTR (moisture vapor transmission rate) of the fabric, or free of surface coatings that alter the MVTR of the fabric that alter the MVTR (moisture vapor transmission rate) of the fabric by more than ±5. In some embodiments, the fabrics will be free of surface coatings that alter the water-repellency (as measured by water droplet contact angle) of the fabric, or free of surface coatings that alter the water-repellency of the fabric by more than ±5. In some embodiments, the fabrics will be free of surface coatings that alter the tensile strength of the fabric, or free of surface coatings that alter the tensile strength of the fabric by more than ±5. In some embodiments, the fabrics will be free of surface coatings that alter the tear strength of the fabric, or free of surface coatings that alter the tensile strength of the fabric by more than ±5.

In one embodiment, a woven fabric is provided that is characterized as passing NFPA 701 Method 1 and/or Method 2 and/or passing CPIA 84 Vertical Burn Test and/or self-extinguishing under the vertical flammability test of ASTM D6413. In one embodiment, a woven fabric is provided that passing NFPA 701 Method 1 and/or Method 2 and/or passes CPIA 84 Vertical Burn Test and/or is self-extinguishing under the vertical flammability test of ASTM D6413, after one, two, five, ten, twenty or more launderings. In another embodiment, a woven fabric is provided which is characterized by a resistance to combustion after one, two, five, ten, and/or twenty launderings that is within 50%, or within 25%, or within 20%, or within 15%, or within 10%, or within 5%, or within 1% of the resistance to combustion prior to laundering.

The fabric may have an air porosity or less than about 20 ft$^3$/min, or less than about 20 ft$^3$/min, or less than about 15 ft$^3$/min, or less than about 10 ft$^3$/min, or less than about 5 ft$^3$/min, or less than about 5 ft$^3$/min, or less than about 2 ft$^3$/min, or less than about 1 ft$^3$/min, or less than about 0.5 ft$^3$/min, or less than about 0.2 ft$^3$/min, or less than or less than about 0.1 ft$^3$/min. In other embodiments, the fabric may have an air porosity of greater than about 0.1 ft$^3$/min, or greater than about 0.5 ft$^3$/min, or greater than about 1 ft$^3$/min, or greater than about 2 ft$^3$/min, or greater than about 5 ft$^3$/min, or greater than about 10 ft$^3$/min, or greater than about 15 ft$^3$/min, or greater than about 20 ft$^3$/min, or greater than about 25 ft$^3$/min, or greater than about 30 ft$^3$/min, or greater than about 40 ft$^3$/min, or greater than about 50 ft$^3$/min.

The fabric may have a hand that is identical to, or substantially identical to, the hand of an otherwise identical dyed fabric that does not have a brominated organic fire-retardant (e.g., FR-245) and synergist (e.g., antimony trioxide) dispersed within the fiber in accordance with the present invention. The hand may be assessed by consumer panel testing using a rating scale of 1-10 (soft-firm) where an identical fabric will be one that is no more than ±0.5 (preferable no more than ±0.25) compared to the otherwise identical fabric made from untreated nylon fibers. A substantially identical fabric will be one that is no more than ±1 compared to the otherwise identical fabric made from untreated fibers. In other embodiments, the hand of the fabric comprising or consisting of fibers according to the invention will have a hand within ±1 or ±2 or ±3 or ±4 or ±5 of the hand of an otherwise identical fabric made from untreated nylon fibers.

The fabric may have a flexibility and/or drape that is identical to, or substantially identical to, the flexibility and/or drape of an otherwise identical dyed fabric that does not have a brominated organic fire-retardant (e.g., FR-245) and synergist (e.g., antimony trioxide) dispersed within the fiber in accordance with the present invention. The flexibility and/or drape may be assessed by panel testing using a rating scale of 1-10 (flexible-stiff) where an identical fabric will be one that is no more than ±0.5 (preferable no more than ±0.25) compared to the otherwise identical fabric made from untreated nylon fibers. A substantially identical and/or drape will be one that is no more than +1 compared to the otherwise identical fabric made from untreated fibers. In other embodiments, the and/or drape of the fabric comprising or consisting of fibers according to the invention will be within ±1 or ±2 or ±3 or ±4 or ±5 of the and/or drape of an otherwise identical fabric made from untreated nylon fibers. In some embodiments, the flexibility may be measured using a Schildknecht flex tester.

In some embodiments, woven fabrics composed of, comprised of, or consisting of fibers made according to the invention will have a MVTR of greater than 100, or greater than 200, or greater than 300, or greater than 400, or greater than 500, or greater than 600, or greater than 700, or greater than 800, or greater than 900, or greater than 1000, or greater than 1200, or greater than 1400, or greater than 1600, or greater than 1800, or great than 2000, or greater than 3000, or greater than 4000, or greater than 5000, or greater than 6000, or greater than 7000, or greater than 8000, or greater than 9000, or greater than 10,000 gms/m$^2$/day, as measured by ASTM E96-80B.

In some embodiments, woven fabrics composed of, comprised of, or consisting of fibers made according to the invention will have a dynamic absorption (see J. E. Simpson and Howorth, R. M., *Textile Research Journal*, (1947) 17:497-503) of less than 50, or less than 40, or less than 30, or less than 25, or less than 20, or less than 18, or less than 15, or less than 12, or less than 10, or less than 8, or less than 5, when measure at 10 minutes, 20 minutes, 30 minutes, an/or 60 minutes. In some embodiments, the dynamic absorption of the fabric will be identical to the dynamic absorption of an otherwise identical fabric prepared from fibers that do not have brominated organic fire-retardant (e.g., FR-245) and synergist (e.g., antimony trioxide) dispersed within the fiber in accordance with the present invention.

In various embodiments, the weight of a woven fabric having fibers comprising or consisting of the fire-retardant fibers according to the invention is not limited but may range from about 0.2 oz/yd$^2$ to about 10 oz/yd$^2$, or from about 0.5 oz/yd$^2$ to about 6 oz/yd$^2$, or from about 1 oz/yd$^2$ to about 3 oz/yd$^2$. In other embodiments, the weight of the fabric may be between about 0.1-0.5 oz/yd$^2$, or 0.5-1 oz/yd$^2$, or 1-2 oz/yd$^2$, or 2-3 oz/yd$^2$, or 3-4 oz/yd$^2$, or 4-5 oz/yd$^2$, or 5-6 oz/yd$^2$, or 6-7 oz/yd$^2$, etc. In some embodiments, the fibers of the invention may be included in a woven or non-woven fabric which may comprise a layer of a laminated fabric. In one embodiment, the fabric of the invention will comprise an outer layer of a laminate (e.g., 2-ply, 3-ply, etc.) or may comprise a middle or inner layer.

While the present invention has been particularly described with respect to the illustrated embodiments, it will be appreciated that various alternations, modifications and adaptations may be made based on the present disclosure, and are intended to be within the scope of the present invention. Any and all such versions and others as readily understood by those of skill in the art are contemplated by the present invention.

The invention claimed is:

1. A fabric comprising:
   a plurality of fire-retardant nylon fibers having dispersed within internal regions thereof
      an amount of a fire-retardant composition comprising:
      (i) a brominated (Br) organic fire-retardant; and
      (ii) a synergist comprising antimony (Sb),
         wherein the brominated organic fire-retardant and the synergist comprising antimony are present in an amount sufficient to provide a weight ratio of elemental Sb and Br (Sb:Br) of from about 1:1 to about 1:10, and
      wherein a major portion thereof is Nylon-6 polymer and/or Nylon-6,6 polymer,
      wherein the plurality of fire-retardant nylon fibers is essentially free of brominated polystyrenes,
   wherein the fabric comprises:
      a fiber of the plurality of fire-retardant nylon fibers having a tensile strength within 20% of the tensile strength of an otherwise identical nylon fiber that does not comprise said fire-retardant composition;
      a moisture vapor transport rate (MVTR) of greater than 100 gms/m$^2$/day;
      an air porosity of about 0.1 ft$^3$/min to about 50 ft$^3$/min; or
      a hand and/or a drape of no more than ±1 compared to an otherwise identical fabric that does not comprise said fire-retardant composition.

2. The fabric of claim 1, comprising an aggregate weight of elemental Sb and Br in the fiber from about 0.1% to about 20% by weight of the total weight of the fiber.

3. The fabric of claim 1, comprising at least about 50% Nylon-6 polymer and/or Nylon-6,6 polymer.

4. The fabric of claim 1, wherein the plurality of fire-retardant nylon fibers is spun from a melt comprising molten nylon polymer homogeneous mixed with said fire-retardant composition.

5. The fabric of claim 1, wherein the fabric is woven or non-woven.

6. The fabric of claim 1, wherein the brominated organic fire-retardant is selected from the group consisting of: tris (tribromophenyl) triazine; tris(tribromoneopentyl)phosphate; pentabromobenzyl acrylate (PBB-MA); poly(pentabromobenzyl acrylate) (PBB-PA); brominated trimethylphenyl indan; and tetrabromobisphenyl A-bis(2,3-dibromopropyl ether).

7. The fabric of claim 1, wherein the brominated organic fire-retardant is a brominated aryl fire-retardant.

8. The fabric of claim 1, wherein the brominated organic fire-retardant is tris(tribromophenyl) triazine.

9. The fabric of claim 1, further comprising from about 0.1% to about 10% brominated inorganic fire-retardant.

10. The fabric of claim 9, wherein the brominated inorganic fire-retardant is a phosphorous-based fire-retardant.

11. The fabric of claim 9, wherein the brominated inorganic fire-retardant is tris(tribromoneopentyl)phosphate.

12. The fabric of claim 1, wherein the synergist is selected from the group consisting of: antimony trioxide, antimony pentoxide, and sodium antimonite.

13. The fabric of claim 1, wherein the synergist is antimony trioxide.

14. The fabric of claim 1, wherein the fire-retardant composition comprises:
   (i) about 0.1% to about 10% tris(tribromophenyl) triazine; and
   (ii) about 0.1% to about 10% antimony trioxide.

15. The fabric of claim 14, the antimony trioxide and the tris(tribromophenyl) triazine are present, collectively, in an amount from about 0.1% to about 20% by weight based on the weight of the fiber.

16. The fabric of claim 14, wherein the antimony trioxide and the tris(tribromophenyl) triazine are present in the fiber in a weight ratio of from about 2:1 to about 5:1.

17. The fabric of claim 14, wherein the antimony trioxide and the tris(tribromophenyl) triazine are present in the fiber in a weight ratio of from about 3:1 to about 4:1.

18. The fabric of claim 14, further comprising from about 0.1% to about 10% inorganic halogenated fire-retardant.

19. The fabric of claim 18, wherein the inorganic halogenated fire-retardant is tris(tribromoneopentyl)phosphate.

20. The fabric of claim 14, comprising at least about 50% Nylon-6 polymer and/or Nylon-6,6 polymer.

\* \* \* \* \*